United States Patent
Dawidowsky

(10) Patent No.: US 7,590,384 B2
(45) Date of Patent: Sep. 15, 2009

(54) METHOD FOR OPERATING A NEAR FIELD COMMUNICATION SYSTEM

(75) Inventor: Frank Dawidowsky, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 323 days.

(21) Appl. No.: 11/208,572

(22) Filed: Aug. 22, 2005

(65) Prior Publication Data

US 2006/0044153 A1      Mar. 2, 2006

(30) Foreign Application Priority Data

Aug. 24, 2004    (EP)    .................... 04020057

(51) Int. Cl.
*H04B 5/00*     (2006.01)
*H04B 7/00*     (2006.01)
*H04M 9/00*     (2006.01)

(52) U.S. Cl. ................. 455/41.1; 455/41.2; 379/433.09

(58) Field of Classification Search ........... 379/433.09; 455/41.2, 41.3
See application file for complete search history.

(56) References Cited

U.S. PATENT DOCUMENTS

| | | | | |
|---|---|---|---|---|
| 6,157,966 A | * | 12/2000 | Montgomery et al. | .......... 710/8 |
| 6,456,191 B1 | | 9/2002 | Federman | |
| 7,342,899 B2 | * | 3/2008 | Suetsugu | .................... 370/328 |
| 2006/0245402 A1 | * | 11/2006 | Fujii et al. | .................. 370/338 |

* cited by examiner

*Primary Examiner*—Nick Corsaro
*Assistant Examiner*—Shannon R Brooks
(74) *Attorney, Agent, or Firm*—Oblon, Spivak, McClelland, Maier & Neustadt, P.C.

(57) ABSTRACT

A method for operating a near field communication system (10) of at least a first and a second near field communication device (21, 22) is proposed. It is a basic aspect of the inventive method to provide a step (S10) of supplying action data (AD) from at least one near field communication device (22) to another one second near field communication device (21), wherein said action data (AD) are descriptive for at least one action or application to be performed within a processing section (PR) of the inventive method.

16 Claims, 5 Drawing Sheets

METHOD FOR OPERATING A NEAR FIELD COMMUNICATION SYSTEM

The present invention relates to a method for operating a near field communication system. The present invention in particular relates to the inverse action for master/slave systems.

Nowadays, a near field communication becomes more and more important. Examples for a near field communication systems or NFC systems are for instance based on the interaction between an intelligent device which in many cases is a so-called intelligent card reader, a card which is capable of carrying and transmitting information from a storage means to the intelligent device or card reader. The interaction between the card reader and the card is for example realized by radiation or radiational contact, for instance by using so-called chip cards. Also contactless interaction between the card reader and the card is in many cases used, in which case the cards are built-up as so-called tags. An intelligent device is referred to be a device which has a certain degree of processing and/or calculation power in order to comply with higher services.

A basic aspect of a near field communication is the usage of electromagnetic waves in radio frequency range and that the transmission of the information content is realized over a short distance only, for instance in the range of several centimeters only.

This principle of short range information exchange by exchanging electromagnetic waves in the radio frequency range might be used in order to establish a communication between two intelligent devices for short range communication. However, no general concept is known how to establish the respective communication in an easy and reliable manner and further without the burden of user interaction. It is therefore an object underlying the present invention to provide a method for operating a near field communication system in a particular reliable and easy way without the necessity of user interaction.

The object is achieved by a method for operating a near field communication system according to independent claim 1. Preferred embodiments of the inventive method for operating a near field communication system are within the scope of the dependent sub-claims. The object is further achieved by a system for operating a near field communication system according to independent claim 17, by a near field communication device according to independent claim 18, by a computer program product according to independent claim 19, and by a computer readable storage medium according to independent claim 20.

The method for operating a near field communication system according to the present invention is adapted in order to operate a near field communication system of at least a first and a second communication device. However, a larger plurality of near field communication devices is thinkable. The near field communication device to be operated according to the present invention must, however, contain at least two near field communication devices as intelligent devices in the above described sense.

The method for operating a near field communication device according to the present invention comprises an initialization section in order to establish and to set-up a connection and a communication between at least said first and said second near field communication devices. Additionally, a processing section is provided in order to select and perform an action by at least said first and said second near field communication devices. The selection and/or the performance of the action is based on said communication between at least said first and said second near field communication devices. According to the present invention said initialization section comprises a step of providing action data from at least one of at least said first and said second near field communication devices to another one of at least said first and said second near field communication devices. Said action data are descriptive for at least one action or application to be performed within said processing section.

It is therefore a basic idea of the present invention to involve within an initialization section of the near field communication a step of providing action data from one device to another device of the near field communication system. Thereby, the other device is informed with respect to at least one action or at least one application which has to be performed within the processing section. This is of particular advantage as it is not necessary to explicitly derive or provide data with respect to the action or application to be performed or to provide such data by the user. Therefore, the communication between the near field communication devices and the action or application during the processing section can be realized by the system in a more or less autonomous way.

According to a preferred embodiment of the present invention said transferred action data are given as an action data or action list.

According to a further additional or alternative embodiment of the inventive method for operating a near field communication system, said action data may contain information with respect to at least one or an arbitrary plurality of the group of items which consists of an application to be performed, of data to be used, data to be generated or supplied, devices to be involved, processing parameters to be taken into account.

It is of further advantage, if according to a further preferred embodiment of the given method for operating a near field communication system said initialization section comprises a step of device discovery in order to determine which devices are present and/or are available in the near field communication system for a near field communication or connection, in particular in accordance to a NFCIP standard.

Preferably, according to a further additional or alternative embodiment of the inventive method for operating a near field communication system, said initialization section may comprise a step of initiator/target assignment in order to set-up a single device of at least said first and second near field communication devices as an initiator device.

In this case, it may be of further advantage if within said step of initiator/target assignment a device of at least said first and second near field communication devices is at most set-up as a target device if and only if it is not set as an initiator device. It is in particular necessary within said near field communication system to set-up at least one device as an initiator device. However, this can be done only for devices which have not been set-up as target devices.

Preferably, all devices of at least said first and second near field communication devices are set-up as target devices unless they are set-up as initiator devices.

According to a further preferred additional or alternative embodiment of the inventive method for operating a near field communication system, respective action data may be provided and/or supplied by target devices only, in particular to initiator devices only. This is the normal situation where only target devices provide their action data or action list to the initiator devices.

It is, however, according to a further alternative and preferred embodiment possible that said respective action data or action list are exchanged between target devices and initiator devices, in particular an initiator device provides its action data or action list to other devices and in particular to one or a plurality of target devices, whereas a target device provides its action data or action list to other devices and in particular to one or a plurality of initiator devices. In this case the initiator devices may alternatively or additionally provide their action data or action list to other devices, in particular to initiator devices or target devices.

It is of further advantage if according to a further alternative or additional embodiment of the inventive method for operating a near field communication system said initiation section comprises a step of providing and/or of supplying application directory data, in particular by said target devices.

In this case it may be of further advantage if said application directory data are provided and/or are supplied upon a step of requesting said application directory data within said initialization section, in particular by said initiator devices.

Further preferably, said step of providing and/or of supplying action data may be carried out upon a step of requesting the provision of action data within said initialization section, in particular by said initiator devices.

According to a further additional or alternative embodiment of the inventive method for operating a near field communication system, a process of exchanging the roles may be performed under certain role change conditions, in order to exchange the roles of an initiator device and a target device.

In this case, the role change condition may be given if at least one of the following conditions is fulfilled:
a given target device does not respond to a request of an initiator device,
an action to be preformed requires an exchange of the roles of target devices and initiator devices in order to realize the performance of the required action in an appropriate manner,
a user request for a role exchange is given.

In these cases said process of exchanging the roles of the target device and the initiator device may be started by providing/supplying respective action data or a respective action list—i.e. action data/an action list which is descriptive for the process of role exchange—to at least said target device wherein the action data are descriptive for the process of role exchange and its sub-processes.

Under these circumstances said process of exchanging the roles may comprise the consecutive steps of:
(E1) shutting down the present initiator device (I) and the target devices, the roles of which are not to be exchanged, if any,
(E2) shutting down or restarting said target device to be role-exchanged or repeating the process of device discovery for said target device to be role-exchanged, thereby setting-up said target device as a new initiator device,
(E3) restarting the former initiator device as well as the target devices not to be role-exchanged, if any, thereby changing the role of the former initiator device to that of a new target device.

According to a further aspect of the present invention a system is provided for operating a near field communication system. It is also an aspect of the present invention to provide a near field communication system itself. The provided systems are according to the present invention arranged and/or capable of realizing the inventive method or to be operated by the inventive method. The systems therefore may have respective means to realize the inventive method or to be operated by the inventive method.

It is a further aspect of the present invention to provide a near field communication device which is arranged and/or adapted and which comprises means to realize the inventive method for operating a near field communication system or to be used in a respective near field communication system. Such a device may therefore be capable of being set-up as a target device or as an initiator device. Further, the inventive near field communication device may be arranged and capable of and may have means in order to provide, carry and/or transfer the respective action data or action list.

According to a further aspect of the present invention, a computer program product is provided, which comprises computer program means which is arranged and/or adapted in order to realize the inventive method for operating a near field communication system and its steps when it is executed on a computer or a digital signal processing means.

Finally, according to the present invention a computer-readable storage medium is provided which comprises the inventive computer program product.

These and further aspects of the present invention will be further discussed in the following:

Overview

The present invention relates in particular to inverse actions for master/slave systems.

Current near field communication or NFC systems are based on a strict master/slave approach. The master or master device has in each case to ask a slave or slave device for every action. Within the NFC base specification according to the near field communication interface and protocol or NFCIP standard the device selection process is non-deterministic. The role of each device is randomly selected.

This invention in particular provides a mechanism in order to inform a (randomly selected) master device of the actions a slave device wants to conduct. This is done by supplying an appropriate protocol.

Common Techniques:

Common near field technology products like RFID, FeliCa (Sony) and Mifare (Philips) are widely deployed. The systems are based on a reader/card architecture, which means that one device is a powerful reader and processing device and the second device is a simple storage card or tag. The NFCIP specification defined by ECMA also describes an active communication mode. In this mode, two powerful reader devices can communicate directly with each other using NFC technology. But the selection of the role, i.e. initiator/initiator device or target/target device, is non-deterministic.

Additionally, there are standardization activities between Philips, Sony and Nokia. The current work is focused on the NTIP protocol which defines the exchange of an application directory and the definition of a transport protocol.

Problem:

The current specification for NFC systems is mainly based on the reader/card architecture. If the reader/card system is used, the reader knows the action, i.e. the reader at the metro station knows that the metro ticket application is requested by the user. But if the direct communication of two active near field communication or NFC devices or peer devices which are equally powerful is used, there might be multiple possible actions using the same application.

If such devices are trying to communicate, usually one of them knows, by user input or other means, what action the user wants to perform. But the current NFCIP specification defines a non-deterministic device detection mechanism which means that the selection of the initiator and target roles is random, e. g. depending on which device has switched on the RF field first. The target device has no means of informing the initiator device about a required action without being asked by the initiator.

To solve this problem a method is needed to inform the randomly selected initiator device about potential action requests from the target.

Solution in Detail

The initiator device has to know what actions have to be performed during the connection. Therefore the target is requested to provide a list of required actions. The selection of the most probable application can be done automatically after the initiator has received the list from the target.

The mechanism, which solves the problem of the randomly selected initiator device, is the introduction of an action list exchange. The current state of the art is that the initiator device will first retrieve the application directory in which all supported application types are listed. This invention proposes to exchange an additional action list between the devices, to share the knowledge on both devices, and to be able to perform the action without asking the user.

Table 1 below lists possible actions which may be required by NFC devices. Table 2 shows an example of an action list provided by a mobile phone. Table 3 shows an example of an action list provided by a laptop.

TABLE 1

Example of Actions for peer to peer data exchange application (Mobile Phone/Laptop).

| Name | Example |
| --- | --- |
| SendFile | Send photo from mobile to laptop |
| ReceiveFile | Receive ring tone from laptop |
| Sync | Synchronize address book |
| EncryptedSync | Synchronize mobile payment account |
| HOBT | Handover to Bluetooth |

TABLE 2

Example Action List on phone.

| Action list entry | Action | Description |
| --- | --- | --- |
| HOBT | Handover to Bluetooth | Use bluetooth for following action |
| SendFile fotojpg size = 50k | Send file from mobile to laptop | Send selected picture to laptop |

TABLE 3

Example Action List on laptop

| Action list entry | Action | Description |
| --- | --- | --- |
| HOWLAN | Handover to WLAN | Use WLAN for following action |
| Sync | Sync with PDA | Synchronise addressbook with PDA |

Figure 3:
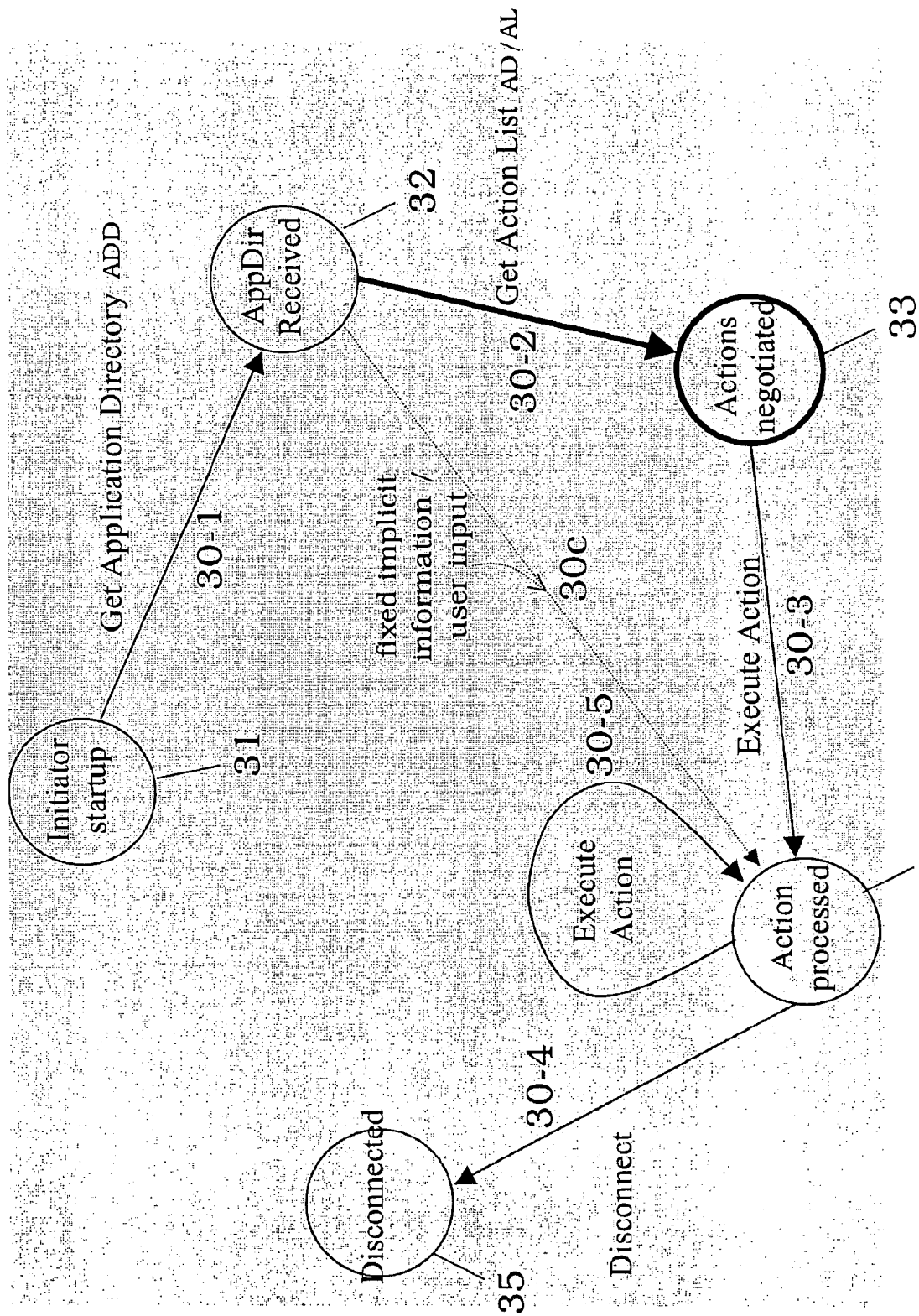

FIG. 3 schematically shows a state machine of a NFC initiator device I. The action data or action list negotiation is done just after the application directory or application directory data exchange.

Figure 4:
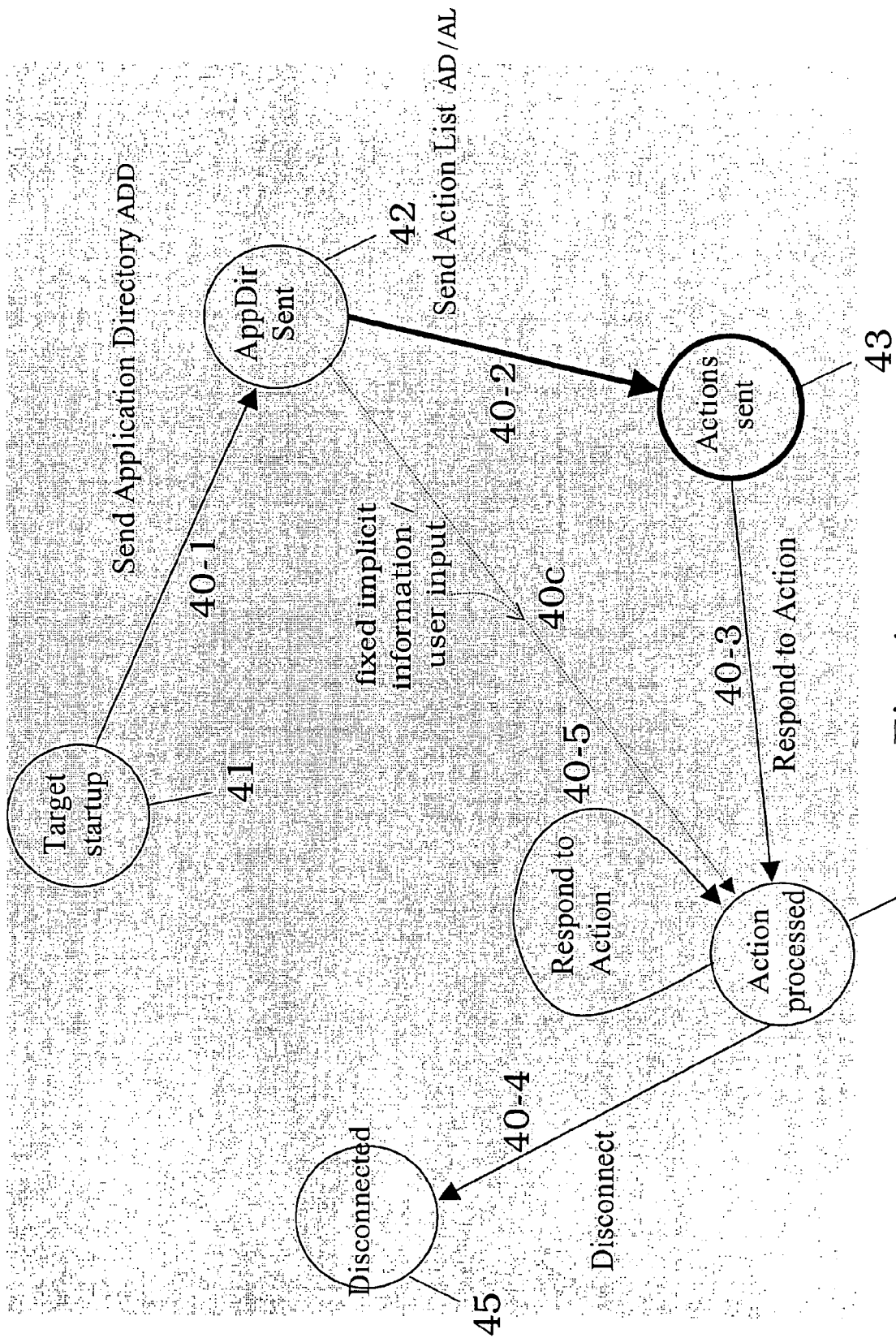

FIG. 4 schematically shows the state machine for a NFC target device T.

Advantages

According to the present invention less user interaction is needed because a manual selection of initiator and target device is not needed. The action to be performed is negotiated automatically.

The NFC communication is started by bringing both devices together. The NFC devices will sense each other and establish a connection without any user interaction. But the application and action the user wants to perform is often depending on the device types, the active application on one device, or some other user input or implicit knowledge on one of the devices. Because the role selection of initiator and target is done randomly, there is a possibility that the initiator does not know the action the user wants to perform. Without the action list exchange, the user has to select the action on both devices manually, but with the action list exchange, the implicit knowledge about the action to be performed, which is available at the target device, is communicated to the initiator.

The invention will now be explained based on preferred embodiments thereof and by taking reference to the accompanying and schematical figures.

Figure 1:
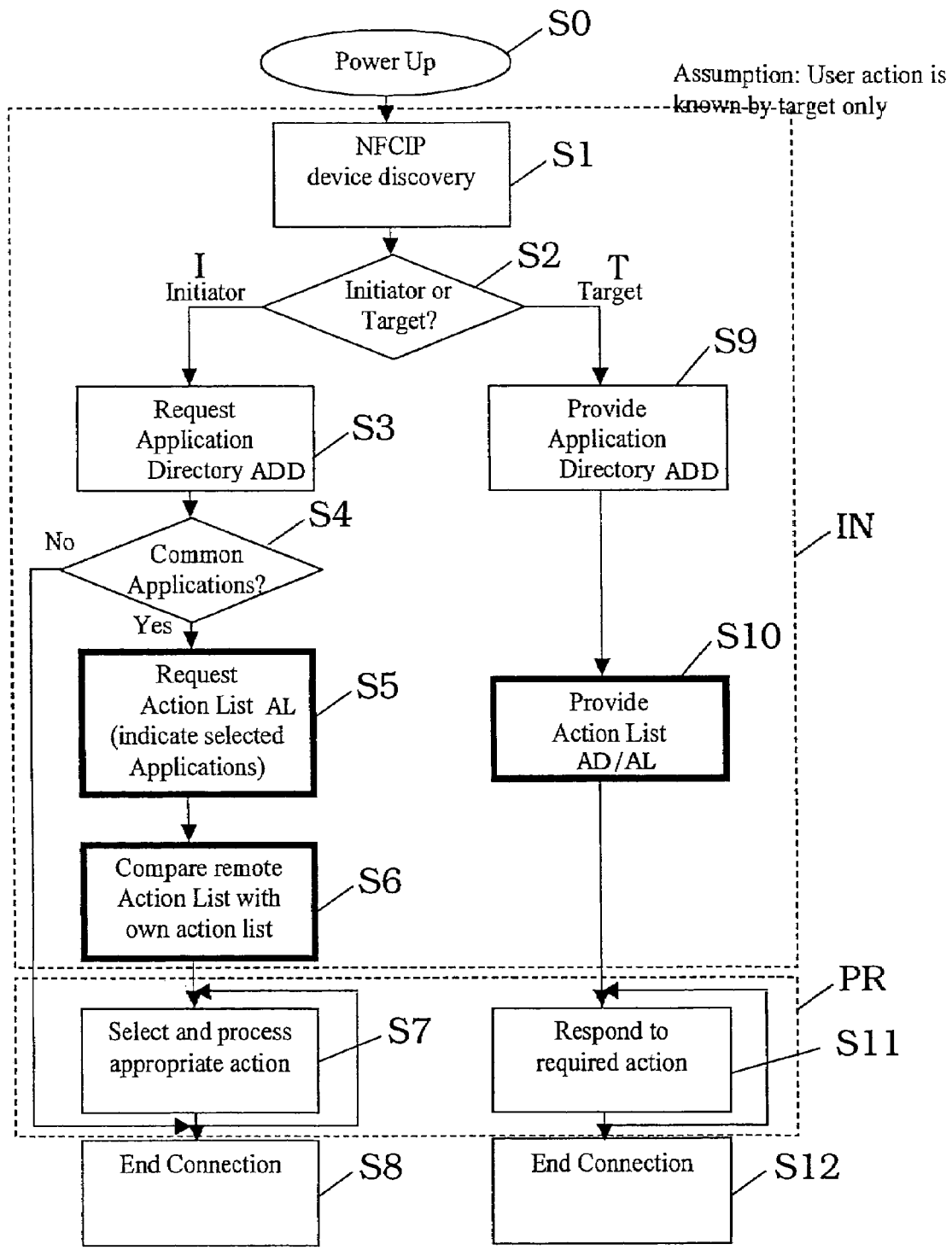
FIG. 1 shows by means of a flowchart for NFC data transfer at what stage during the connection setup the action lists are exchanged.

FIG. 1 is a flow chart of a preferred embodiment of the inventive method for operating a system for near field communication.

Figure 2:
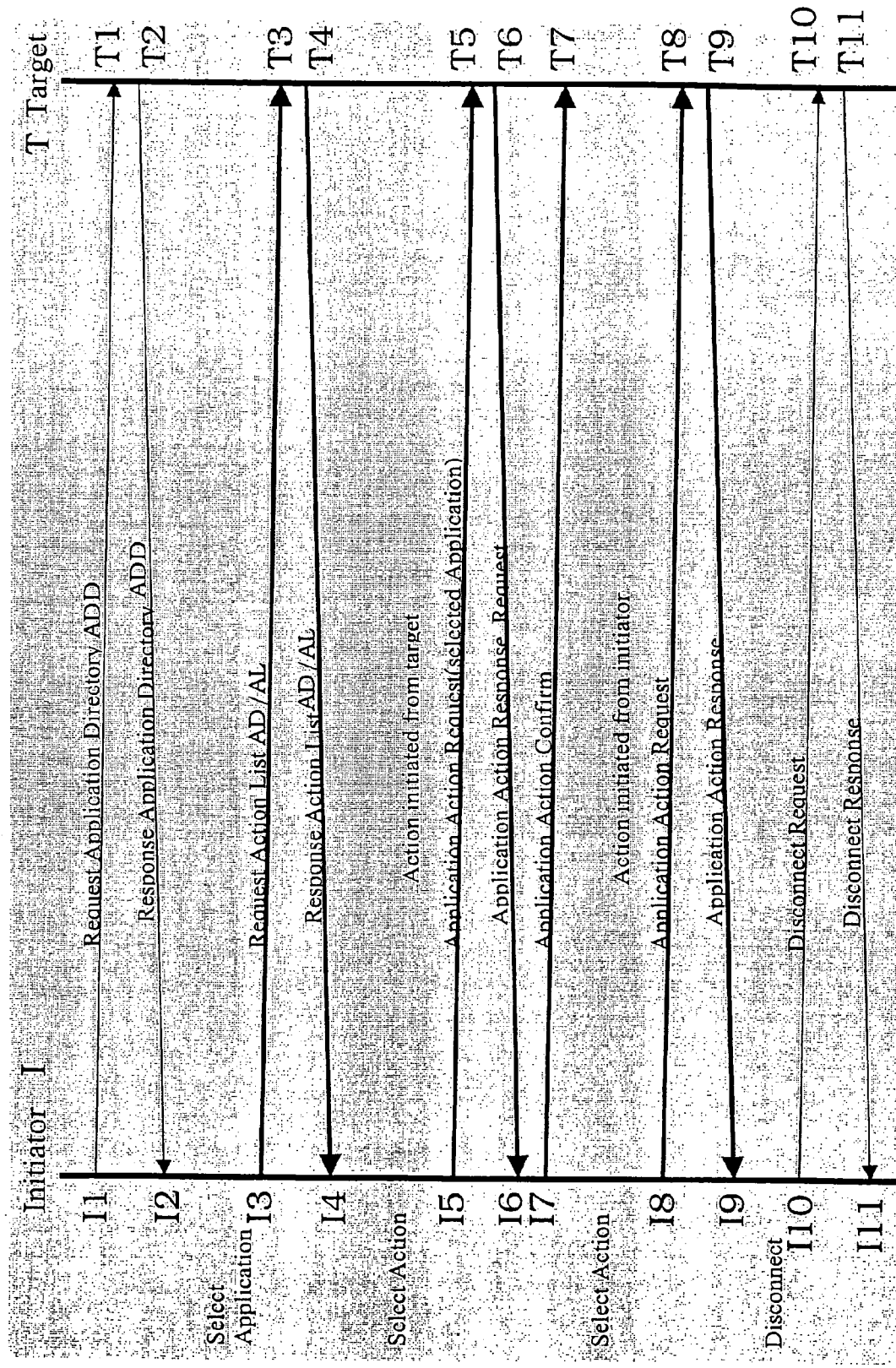
FIG. 2 shows by means of a message sequence chart for an initiator device and a target device a message sequence that may be exchanged between an initiator device and a target device in order to exchange the action list. Depending on which device is requiring the action, the message flow between initiator and target may be different.

FIG. 2 is a schematical method sequence chart elucidating a further preferred embodiment of the present inventive method for operating a near field communication system.

FIG. 3 shows a state machine for an initiator device according to a preferred embodiment of the inventive method for operating a near field communication system.

FIG. 4 shows a state machine for a target device according to a preferred embodiment of the inventive method for operating a near field communication system.

Figure 5:
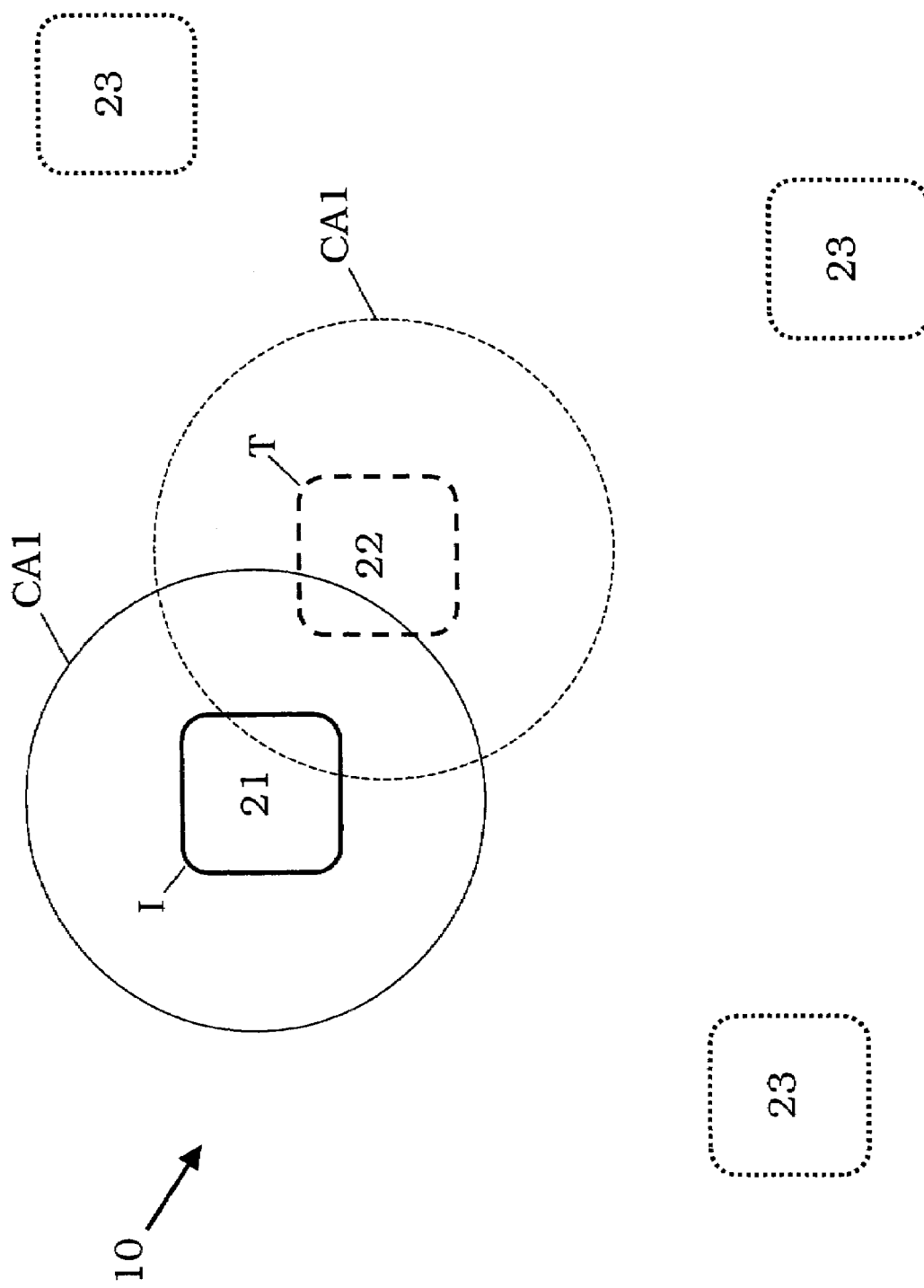

FIG. 5 is a schematical block diagram of a preferred embodiment of a system for near field communication.

In the following functional and structural similar or equivalent element structures will be denoted with the same reference symbols. Not in each case of their occurrence a detailed description will be repeated.

FIG. 1 is a schematical flow chart describing a preferred embodiment of the inventive method for operating a near field communication system or a part of said method. The flow chart of FIG. 1 may be referred to as the processing for a single given device. After a power-up procedure according to step S0, the initialization section IN is entered. After the finalization of which the processing section PR is performed after which the connection to the system is terminated according to the steps S8 and S12, respectively.

In a first step S1 of the initialization section IN, a process device discovery, in particular according to the NFCIP standard is performed in order to determine the presence of possible communication partner devices. If the radio fields or RF field of a present partner device can be found in the initiator/target assignment step S2 of the initialization section IN, the device in question is assigned as a target device T. If instead no radio field or RF field of the present partner device can be detected, the device in question is assigned as an initiator device I.

As an initiator device I a step S3 of requesting application directory data ADD from discovered communication partner devices is requested. In a following step S4 it is checked on whether or not the device in question as an initiator device I and the communication partner devices have the common applications. If this is not the case, the processing for the initiator device I continues with the process of S8 of ending the connection. If there are common applications detected in step S4, a request for action data or for an action list in a step S5 is transferred to the communication partner devices in order to receive an indication of selected applications by the communication partner devices and in particular by target devices T in the neighbourhood of the initiator device I. After receipt of the action data or the action list AL, the remote action list from the target devices or other initiator devices is compared with the initiator devices or an action list or action data in a step S6. Then, the initialization section IN is finalized and the processing section PR is entered in which within a following step S7 a respective and appropriate action or application is selected and performed and processed. Step S7 may be repeated as many times as necessary, either with repetition with the same action or application or with different applications or actions. After finalizing the processing section PR, the connection is terminated in a final step S8 after which a standby mode may be entered by the device in question as an initiator device I.

If the device in question has been assigned as the target device T, a request for application directory data ADD is received, after which in a step S9 the respective application directory data ADD are transmitted to be received by an initiator device I in the neighbourhood. To a later time, a request for providing action data ADD or an action list AL is received by the device in question as a target device T, in which case in a following step S10 the respective action data or action list are provided and transmitted to be received by an initiator device I in the neighbourhood. Then, the initialization section IN for the target device T is left and the processing section PR is entered by executing in a following step S11 a response to the required action. This may be repeated as many times as necessary. After finalization of processing section PR, the processing section PR is left and the connection is terminated in a following and final step S12, after which also the target device T may be set into a standby mode.

FIG. 2 is a schematical message sequence chart with shows the information and message exchange between a given initiator device I and a target device T. In a step I1 a request for application directory data ADD is transmitted from the initiator device I to the target device T and received in the latter in a step T1. As a response the respective application directory data ADD are sent our by the target device T in a following step T2 after which the respective application directory data ADD are received in a following step I2 by the initiator device I. Then, a certain application is selected and in a following step I3 action data or an action list is requested by the initiator device I. The request is received by the target device T in a following step T3 and the target device T responds by transmitting the respective action data AD or action list AL in a following step T4 to the initiator device I, which then receives in a further step I4 the action list AL or the action data AD.

Then a certain action or a sequence of actions is selected. In a following step I5, the initiator device I initiates an action from the target by transmitting to the respective target device T an application action request with respect to the selected application, which is then received by the target device T in a following step T5. As a consequence in a further step T6, the target device T transmits a respective application request response with respect to the selected application which is received in a step I6 by the initiator device I and then in a following step I7 confirmed by an application action confirmation, which is received in a following step T7 by the target device T.

If an action is initiated from the initiator device I in a step I8, the initiator device I transmits an application action request with is received by the target device T in a step T8 and appropriately responded by a respective application action response sent out in a step T9 by the target device T and received in a step I9 by the initiator device I.

The disconnection of the communication is established by sending out a disconnect request in a step I10 by the initiator device I which is received by the target device T in a step T10 and answered by the target device T in a step T11 by transmitting to the initiator device I a disconnect response which is received by the initiator device I in a step I11.

It is possible to have a plurality of applications performed each of which comprising or consisting of one or a plurality of actions in each case.

FIG. 3 is a schematical diagram demonstrating a state machine for an initiator device I. First of all, the initiator device I is in its initiator start-up state 31. Then a transition 30-1 is realized by getting the application directory data ADD from a respective target device T, thereby intern realizing a transition to a state 32 in which the initiator device I has received the application directory data ADD from said target device T.

In common communication schemes for near field communication fixed implicit information or user input information is used in order to realize a transition 30c to have a transit to the state 34 in which the execution 30-5 of actions is possible and in which then the actions are processed. In order to avoid the commonly necessary fixed implicit information/ or the user input according to the present invention, a new transition 30-2 is introduced by getting an action list or the action data from the respective target device or target devices T in order to have a transit to a further new state 33 in which the actions to be performed are negotiated between the respective devices. Then the negotiated actions are executed in order to realize a transition 30-3 to have a turnover to the state 34 in which the actions are processed. Finally, a disconnect transition 30-4 is performed in order to enter the state 35 for the initiator device I, namely a disconnected state.

It is possible to have a plurality of applications performed each of which comprising or consisting of one or a plurality of actions in each case. The latter aspect is indicated by the transition 30-5.

In a similar manner FIG. 4 describes in a schematical way a state machine for a target device T. After the initiator/target assignment process the target device T enters a target start-up state 41 from which a transition 40-1 is realized by sending the requested application directory data to the respective initiator device I. By realizing the transition 40-1, the target device T enters the state 42 in which the application directory data ADD are sent to the initiator device I. In common near field communication schemes, upon the usage of fixed implicit information/or upon user input, a transition 40c realizes the transit of the target device T from the state 42 directly to the state 44 in which a response to the requested action is realized and thereby the actions are processed. In order to avoid the necessity of fixed implicit information and/or the necessity of user input according to the transition 40c, a new transition 40-2 of transmitting or sending the action data or action list to the initiator device I by the respective target device T is introduced, thereby realizing a transit of the target device T from the state 42 to a state 43 in which the action data, the action list and thereby the actions are sent from the target device T to the initiator device I. The response to the actions realizes the transition 40-3 to the state 44 in which the actions are processed. Then, a further transition 40-4 of disconnecting the connection leads to a transit for the target device T from state 44 to a disconnected state 45.

It is possible to have a plurality of applications performed each of which comprising or consisting of one or a plurality of actions in each case. The latter aspect is indicated by the transition 40-5.

FIG. 5 is a schematical block diagram which demonstrates the typical near field communication situation and a respective near field communication system 10. The near field communication system 10 shown in FIG. 5 comprises a first near field communication device 21 which is assigned to be an initiator device I and a second near field communication device 22 which is assigned to be a target device T. Also further near field communication devices 23 are present. However, according to the short range behaviour of the communication channel, the further devices 23 are situated outside the communication areas CA1 and CA2 of the initiator device I, 21 and the target device T, 22, respectively. Therefore, the further devices 23 are not capable of contributing to the system 10 and to its communication. Only the target device T, 22 and the initiator device I, 21 lie within the communication areas CA1 and CA2, respectively.

| Reference Symbols | |
|---|---|
| 10 | system for near field communication according to the present invention |
| 21 | first near field communication device |
| 22 | second near field communication device |
| 23 | near field communication device |
| AD | action data |
| ADD | application directory data |
| AL | action list |
| CA1, CA2 | communication area |
| I | initiator device |
| I' | new initiator device |
| IN | initialization section |
| PR | processing section |
| T | target device |
| T' | new target device |

The invention claimed is:

1. A method for operating a near field communication system of at least a first and a second near field communication device, comprising:
    discovering at least one of a presence of the first near field communication device by the second near field communication device, and a presence of the second communication device by the first communication device based on field detection by approaching the first and second near field communication devices towards each other;
    establishing and setting-up a connection and a communication between at least said first and said second near field communication devices, when said discovering has confirmed detection of at least one of the first or second near field communication devices;
    selecting and performing at least one of an action and application by at least said first and said second near field communication devices based on said communication between at least said first and said second near field communication devices;
    selectively assigning an initiator role to either the first near field communication device and a target role to the second near field communication device, or the target role to the first near field communication device and the initiator role to the second near field communication device to set-up a single device from said first and second near field communication devices as an initiator device, after said step of establishing and setting-up the connection and the communication;
    requesting action data that is descriptive for the at least one of the action and the application by the assigned initiator device; and
    providing the requested action data from at least one of at least said first and said second near field communication devices to the assigned initiator device.

2. The method according to claim 1,
    wherein said action data is provided as an action list.

3. The method according to claim 1, wherein said action data includes information with respect to at least one or any arbitrary plurality of a group of items that includes at least one of an application to be performed, data to be used, data to be generated or supplied, devices to be involved, processing parameters to be taken into account.

4. The method according to claim 1, wherein said discovering further comprises:
    discovering the presence of the first and second near field communication device in the near field communication system according to a NFCIP standard.

5. The method according to claim 1, wherein said step of assigning a initiator/target device further comprises:
    assigning a target device from the at least first and second near field communication devices when the assigned target device was not previously set-up as an initiator device.

6. The method according to claim 1,
    wherein all devices of at least said first and second near field communication devices are set-up as target devices, unless they are set-up as an initiator devices by said step of assigning.

7. The method according to claim 5,
    wherein respective action data are provided/supplied by target devices to initiator devices.

8. A method according to claim 5,
    exchanging action data between target devices and initiator devices, in particular an initiator device provides at least one of action data and action list to one or a plurality of target devices, and a target device provides at least one of action data and action list to other devices and in particular to one or a plurality of initiator devices.

9. The method according to claim 1, further comprising a step of:
    providing and supplying application directory data by a target device.

10. The method according to claim 9, said step of providing and supplying application directory data further comprises:
    requesting said application directory data by said initiator device.

11. The method according to claim 1, further comprising the steps of:
    exchanging roles under certain role change conditions to exchange a role of the initiator device and a target device.

12. The method according to claim 11, wherein said step of exchanging roles is performed when at least one of a given target device does not respond to request of an initiator device, an action to be preformed requires a role exchange in order to be performed appropriately, and a user request for a role exchange is given.

13. The method according to claim 11, wherein said step of exchanging roles is started by providing/supplying respective action data to said target device which are descriptive for the step of exchanging roles.

14. The method according to claim 11, wherein said step of exchanging roles further comprises the steps of:
    shutting down the initiator device and the target devices, the roles of which are not to be exchanged;

shutting-down and restarting said target device to be role-exchanged or repeating said process of device discovery for said target device to be role-exchanged, thereby setting-up said target device to be role-exchanged as any initiator device; and restarting the initiator device, thereby changing the role in order to be a new target device.

15. A communication system including at least a first and a second near field communication device, comprising:

means for discovering at least one of a presence of the first near field communication device by the second near field communication device, and a presence of the second communication device by the first communication device based on field detection, when the first and second near field communication devices are in close range to each other;

means for establishing and setting-up a connection and a communication between at least said first and said second near field communication devices when said means for discovering has confirmed detection of at least one of the first or second near field communication devices;

means for selecting and performing at least one of an action and application by at least said first and said second near field communication devices based on said communication between at least said first and said second near field communication devices;

means for selectively assigning a initiator role to either the first near field communication device and a target role to the second near field communication device, or the target role to the first near field communication device and the initiator role to the second near field communication device to set-up a single device from said first and second near field communication devices as an initiator device, after said means for establishing has set-up the connection and the communication;

means for requesting action data that is descriptive for the at least one of the action and the application by the assigned initiator device; and means for providing the requested action data from at least one of at least said first and said second near field communication devices to the assigned initiator device.

16. A near field communication device which is configured to perform or participate in a method for operating a near field communication system according to claim 1.

* * * * *